Nov. 18, 1969 R. K. H. GEBEL 3,479,455

IMAGE TRANSDUCERS USING EXTRINSIC SEMICONDUCTORS

Filed April 1, 1966 2 Sheets-Sheet 1

INVENTOR.
R. K. H. GEBEL
BY Harry A. Herbert Jr
ATTORNEY
James S. Shannon
AGENT

IMAGE TRANSDUCERS USING EXTRINSIC SEMICONDUCTORS

Filed April 1, 1966 2 Sheets-Sheet 2

INVENTOR.
R. K. H. GEBEL
BY Harry A. Herbert Jr
ATTORNEY
James S. Shannon
AGENT

United States Patent Office 3,479,455
Patented Nov. 18, 1969

3,479,455
IMAGE TRANSDUCERS USING EXTRINSIC SEMICONDUCTORS

Radames K. H. Gebel, Dayton, Ohio, assignor to the United States of America as represented by the Secretary of the Air Force Filed Apr. 1, 1966, Ser. No. 540,161
Int. Cl. H04n 5/38
U.S. Cl. 178—7.2 5 Claims

ABSTRACT OF THE DISCLOSURE

An image transducer for low quantum energy radiation having periodic erasure of the information carriers and quanta collection for all or substantially all of the frame period. The image is received by a semiconductor having an extrinsic energy level intermediate the valence and conduction bands and having an energy gap to one of the bands that is less than the quantum energy of the radiation. An erasing radiation having a quantum energy corresponding to the greater of the two energy gaps between the extrinsic level and the valence and conduction bands, is applied to the semiconductor once each frame period, either by flooding the entire image area for a small fraction of the frame period or in the form of a scanning spot, to cause the information carriers to fall back from the conduction band to the valence band giving off radiation of quantum energy corresponding to the gap between the two bands. This radiation is converted to a video signal by a suitable photoelectric transducer.

Figure 1:
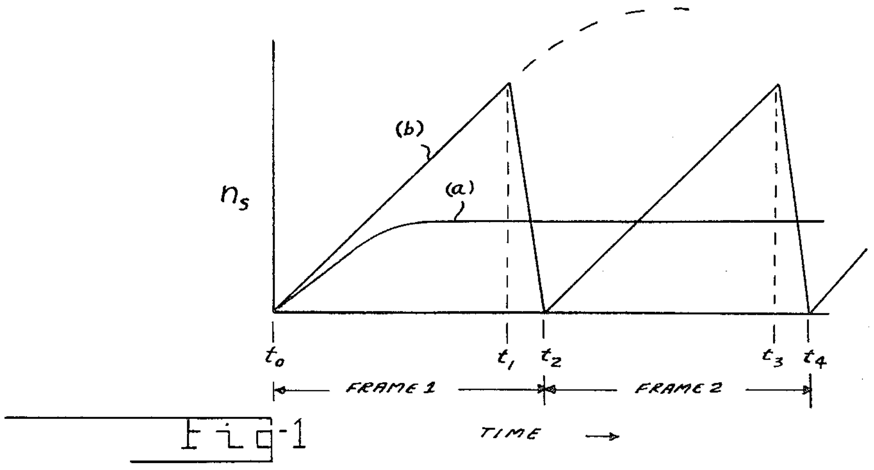

The invention described herein may be manufactured and used by or for the United States Government for governmental purposes without the payment to me of any royalty thereon.

This invention relates to image transducers capable of following motion which use semiconductors as radiation detecting elements and which, in order to follow motion, require by some process a periodic erasure of the information carriers in the conduction band of the semiconductor. The purposes of this invention are to increase the sensitivity of image transducers of this type and to extend the spectral range of their photodetectors to include radiations having insufficient quantum energy to raise electrons from the valence band to the conduction band of the semiconductors used as the photodetectors. A further object of the invention is to provide a process for preparing extrinsic semiconductors for use as photodetectors in image transducers designed and operated in accordance with the principles of the invention.

Image transducers are here meant to include not only devices for converting an optical image into a video signal, but also devices for converting an image in one portion of the spectrum into an image in another portion of the spectrum, for example, from an invisible portion to the visible portion. The invention is particularly useful at wavelengths longer than 1 $\mu$m ,$10^{-6}$ meters or 10,000 A.), i.e. in the infrared region.

Modern image transducers employ a semiconductor used as either a photoemitter or as a photoconductor for sensing the optical image. The image orthicon and image isocon are examples of transducers using photoemission. In these, the quantum energy of the radiation cannot be less than the energy gap between the valence band and the vacuum level for the semiconductor used as the photodetector, and, therefore, they will not detect radiations at wavelengths longer than that corresponding to this energy gap. The vidicon is an example of current image transducers using photoconduction. In this type of conventional photoconductive device the minimum detectable quantum energy level, while less than that for photoemissive devices, cannot be less than the energy gap between the valence band and the conduction band of the semiconductor used as the photodetector, and the wavelength at which the quantum energy equals this energy gap is the maximum that can be detected.

In accordance with the invention, both the increase in sensitivity and the extension of the spectral range of image transducers are accomplished by making use of the energy levels that exist in the gap between the valence and conduction levels of extrinsic semiconductors.

Considering conventional image transducers further, in the image orthicon and image isocon the photoemitter converts the optical image into an electron image, and the electron image in turn is converted into a corresponding charge pattern. As a result, the magnitude of the charge on each resolution element of the charge pattern is directly related to the intensity of the radiation in the corresponding elemental area of the optical image. Scanning of the charge pattern with an electron beam produces a video signal and in the process neutralizes the charge. The scanning process, therefore, constitutes a controlled erasure of the stored information and permits movement in the scene to be followed at frame frequency, which can be made relatively high if desired. The high sensitivity of these devices is due largely to the fact that each elemental area of the charge pattern accumulates charge for the full frame interval between scans.

In image transducers which employ photoconductivity and electron beam scanning, such as the vidicon, the optical image is formed on one side of a photoconductive target plate the other side of which is scanned by an electron beam. Each elemental area of the target plate is in effect a small capacitor shunted by the conductance of the target plate at that point, this conductance being directly related to the light intensity at that point in the optical image. The elemental capacitors are connected in parallel in a charging circuit that includes a source of direct current, an output resistor, and the scanning beam. As the scanning beam passes over each elemental area of the target plate, the elemental capacitor associated with it is fully charged. The amount of charge required to fully charge the capacitor depends upon the extent to which the capacitor has discharged through the conductance of the photoconductor during the preceding scanning or frame interval. The extent of discharge in turn depends upon the conductance of the photoconductor at that point as determined by the light intensity in the image at that point. As the beam scans, the variations in the charging current flowing through the output resistor constitute the video signal.

The scanning beam in the vidicon does not affect the conductivity of the target plate and consequently does not erase the information contained in its conductivity pattern. In other words, the recombination of the information carriers, i.e. conduction band electrons, produced in the photoconductor by the incident radiation is not affected by the scanning beam but occurs by a mechanism inherent in the semiconductor used. Further, the recombination rate depends directly upon the number of carriers present. As a result, for a given incident radiation, the number of carriers increases with time until a condition of equilibrium is reached in which the recombination rate equals the carrier formation rate. Therefore, for an image transducer of the vidicon type to follow motion, the photoconductive material must be chosen with an inherent carrier recombination characteristic that permits carrier equilibrium to be attained in less than a frame interval.

In photoconductive image transducers which employ a single photodetector and mechanical scanning, photons from each elemental area of the optical image fall on the photodetector for only a very small portion of the total frame interval, the portion being inversely related to the number of elemental areas.

The sensitivity of an image transducer is a direct function of the portion of the frame interval during which quanta are effectively collected, an effectively collected quanta being one that contributes to the output of the image transducer. In the image orthicon and image isocon mentioned above, quanta are effectively collected for the entire frame interval. In the vidicon and similar devices, quanta collected after carrier equilibrium has been reached do not affect the output, so that quanta are effectively collected for considerably less than a frame interval. Finally, in systems using mechanical scanning and a single photodetector, quanta are effectively collected for a very small portion of the scanning cycle, this portion being inversely related to the number of resolution elements.

In accordance with the invention, the sensitivity of low quantum energy image transducers is increased by providing through the use of extrinsic semiconductors a controlled erasure that allows photons to be effectively collected for all or a very large fraction of the total frame interval.

In one embodiment of the invention the semiconductor employed has an extrinsic energy level, which may be either a donor or an empty level, located between the conduction and valence bands and separated from the conduction level by an energy gap not in excess of the quantum energy of the infrared radiation to be detected. A pumping light source, synchronized with the scanning of the image orthicon or isocon, floods the semiconductor for the purpose of raising electrons from the valence band to the extrinsic level. If the extrinsic level is a donor level, the electrons raised from the valence band fill holes left at the extrinsic level by the electrons that were raised from this level to the conduction band by the infrared radiation, and allow the latter electrons to recombine with the resulting holes in the valence band, giving off radiation in the spectral range of the image orthicon or isocon in the process. If, on the other hand, the extrinsic level is an empty level, the electrons raised from the valence band provide electrons at the extrinsic level which can be raised to the conduction band by the infrared radiation and which then recombine with the holes left in the valence band with the production of radiation within the spectral range of the image orthicon or isocon.

In another embodiment of the invention, a semiconductor having an extrinsic donor level is used and the operation is fundamentally the same as that described above for this type of semiconductor. However, in this case, the pumping light is in the form of a small spot which is caused to scan the semiconductor providing a controlled recombination of the conduction electrons and producing light in the process. This light is collected by a photomultiplier to produce a video signal which is applied to a kinescope, the scan of which is synchronized with the scanning spot, to provide a visible image.

Figure 2:
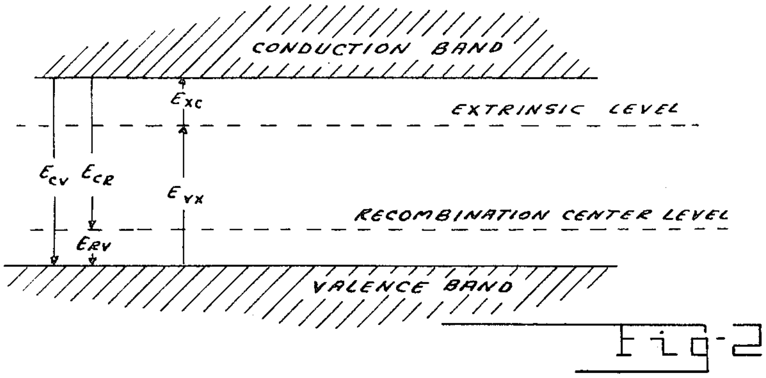
Figure 3:
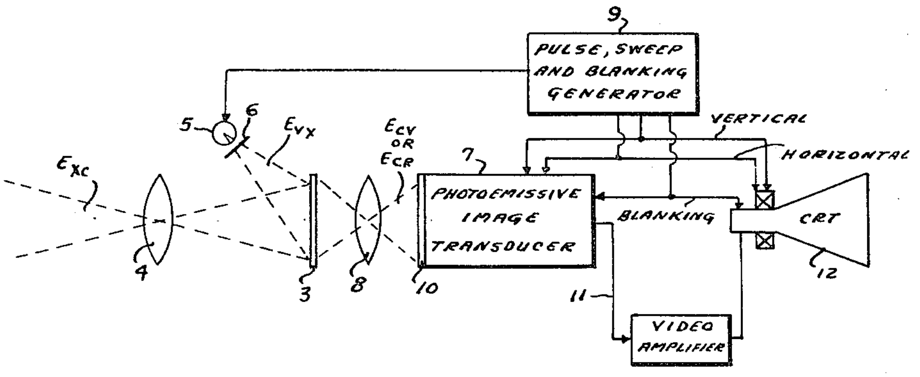
Figure 4:
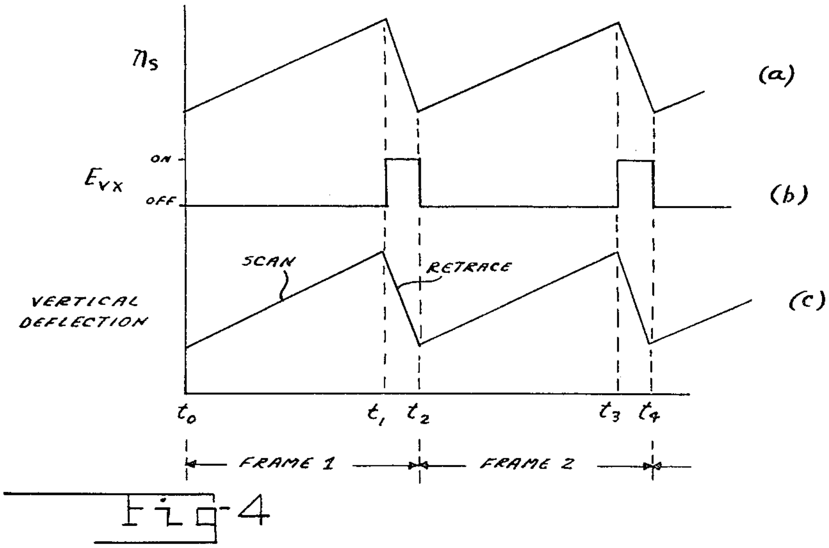
Figure 5:
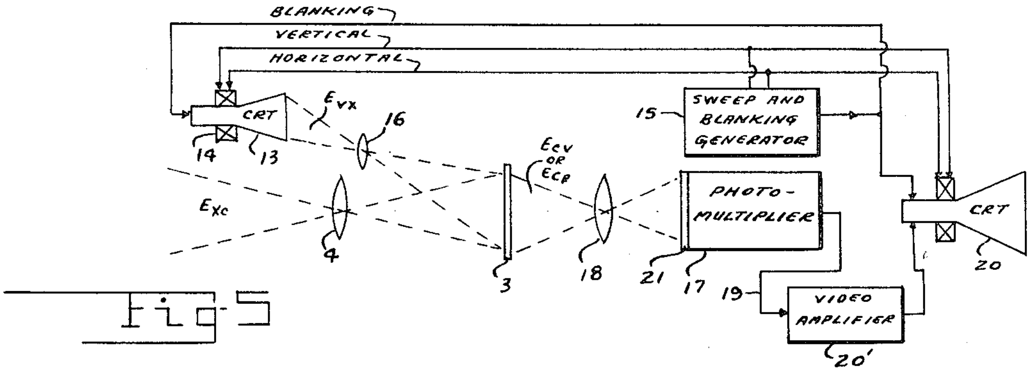
Figure 6:
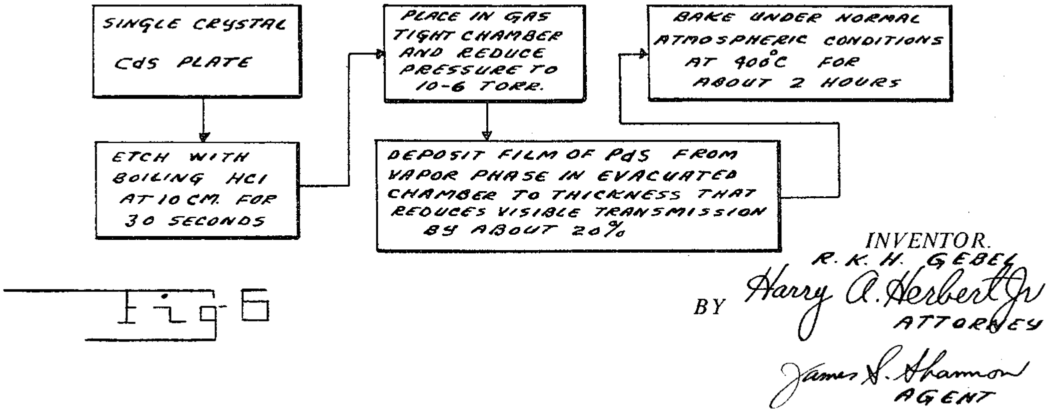

The invention will be described in more detail with reference to the specific embodiments thereof shown in the accompanying drawings in which FIG. 1 illustrates uncontrolled and controlled recombination of conduction band electrons in a semiconductor, FIG. 2 is a simplified energy diagram of an extrinsic semiconductor as used in the invention, FIG. 3 illustrates a transducer in accordance with the invention in which combined erasure and readout of the information carriers in the extrinsic semiconductor occurs simultaneously for all elemental areas of the target plate, FIG. 4 shows waveforms applicable to FIG. 3, FIG. 5 illustrates a transducer in which combined erasure and readout of the information carriers in the extrinsic semiconductor occurs sequentially for the elemental areas of the target plate, and FIG. 6 illustrates a process for preparing semiconductive target plates as used in the invention.

The photodetection of an optical image, like the act of vision, may be considered essentially as a counting and a spatial and temporal correlation of the effective number of events of a given species (electrons, grains, nervous excitations, etc.) per resolution element caused by the incident quanta during successive increments of time which depend in length upon the rapidity of motion in the image to be followed.

For image transducers using photoemission, such as the image orthicon and isocon already referred to, in which complete erasure of the information is achieved in each frame, the general equation for the number of primary electrons $n_p$ (photoelectrons plus dark current) for each resolution element per frame is $$n_p = Qt_fH_c + E_Dt_f \qquad (1)$$

where

Q=number of quanta per second focused onto a resolution element of the photosensor $H_c$=quantum conversion yield of a photoemissive detector, i.e. the ratio of the number of electrons released by the detector to the number of quanta focused onto it $E_D$=dark current in electrons per second $t_f$=frame interval From this equation it is seen that, for a given Q, $n_p$ is a linear function of time. When the internal noise of a device, other than the unavoidable minimum conversion noise and the statistical fluctuations of the dark current can be made negligible, a device operating in a mode for which Equation 1 is valid will yield optimum theoretical sensitivity for a given set of parameters.

Equation 1 is not valid for detection when using photoconductivity in a conventional manner, such as in the vidicon. In this case the number of carriers $n_s'$ per resolution element remaining at the time $t_f$ may be expressed as $$n_s' \approx n_0 + Qt_fH_s(1-R) \qquad (2)$$

where $n_0$=initial number of carriers due to dark current and previously absorbed radiation Q=number of quanta per second focused onto a resolution element of the photosensor $H_s$=quantum conversion yield (ratio of the number of carriers produced to the number of quanta focused onto the photoconductor)

R=recombination factor $t_f$=frame interval

The recombination factor R is a direct function of the number of carriers and hence of the parameters of the equation, and may be determined experimentally.

The rate of recombination $r$ in carriers per second per resolution element may be expressed as $$r = Kn_s^m \qquad (3)$$

where $n_s$ is the number of carriers and K and $m$ depend upon the semiconductor used. The exponent $m \leq 2$ and may be a polynomial because of the complex trapping and recombination effects. For a constant flux of light focused onto the semiconductor, $r$ increases with time until equilibrium is reached between the rate of carriers produced and the rate of recombination. Therefore, the recombination rate for the state of equilibrium, $r_E$, in electrons per second, may be written $$r_E = QH_s \qquad (4)$$

When the state of equilibrium is reached no further increase in the number of carriers occurs without an increase in light flux.

A container into which water is poured at a constant rate, simulating a constant light flux, provides a simple analogy to the modes of photodetector operation defined by Equations 1 and 2. In the case of Equation 1, the container has a closed bottom so that the amount of water in the container, corresponding to the number of photoelectrons produced, increases linearly with time. In the case of Equation 2, the bottom of the container is a stretchable membrane with a hole through which water constantly flows out of the container. As the weight of water in the container, corresponding to the number of carriers, increases, the size of the hole increases, due to stretching of the membrane, and the outflow increases. When the outflow becomes equal to the inflow, a state of equilibrium is established and no further increase in water in the container occurs.

Curve *a* in FIG. 1 illustrates the operation of a conventional photoconductive image transducer, such as the vidicon, in accordance with Equation 2. As seen, the number of carriers $n_s$ increases with time until the above described condition of equilibrium is reached. In order to detect a sudden change in light flux from one frame to the next, the time required to reach the state of equilibrium in the number of carriers after the flux has changed must be considerably shorter than a frame interval, as illustrated. Under these conditions, the sensitivity of the device is inherently less than it would be if there were no uncontrolled recombination of the carriers and, as a result, the difference between the number of carriers present at the end of a scanning interval and the number present at the beginning were directly proportional to the number of quanta received during the interval.

While it is not possible in a conventional image transducer such as the vidicon to have the number of carriers, for a constant light flux, increase linearly with time during the entire frame interval in a manner analogous to the operation of the image orthicon as expressed by Equation 1, since recombination of the carriers is not effected by the scanning process, it is possible in accordance with the invention to approach this ideal over a large part of the frame interval. The operation in this case may be represented by curve *b* in FIG. 1 in which, neglecting the initially present carriers, the number of carriers, for a constant light flux, increases linearly with time with negligible recombination during the interval $t_0$–$t_1$. Controlled recombination of the carriers then occurs during the relatively short interval $t_1$–$t_2$. Since recombination cannot be controlled in an intrinsic semiconductor, such operation requires the use of an extrinsic semiconductor having certain extrinsic energy levels in the gap between the valence and conduction bands.

Group II–VI compounds, such as CdS, with the proper impurities and irregularities in crystalline structure, provide suitable extrinsic semiconductors for accomplishing the purposes of the invention. FIG. 2 is a simplified energy diagram of such a semiconductor. If the extrinsic level is an empty level, flooding with radiation of quantum energy $E_{VX}$ raises electrons from the valence band to the extrinsic level leaving holes in the valence band. Absorption of radiation with a quantum energy $E_{XC}$ (infrared) can now induce transition of these electrons to the conduction band from where they recombine with the holes in the valence band either directly, releasing radiation of quantum energy $E_{CV}$, or through a recombination center level releasing radiation of energy $E_{CR}$. If the extrinsic level is a donor level, absorption of radiation of quantum energy $E_{XC}$ raises electrons from this level to the conduction band, leaving holes at the extrinsic donor level which become trapped. This results in a long persistent photoconductivity. If the crystal now absorbs energy with a quantum energy $E_{VX}$, electrons are raised from the valance band to the extrinsic level, filling the trapped holes and leaving holes in the valence band. Recombination then occurs between the conduction band electrons and the holes in the valence band, directly or through a recombination center level, giving off radiation of energy $E_{CV}$ or $E_{CR}$, as before.

Semiconductor crystals which have the behavior described above may be used as target plates for the detection of images formed by radiation with quantum energy of either $E_{XC}$ or $E_{VX}$. Although in FIG. 2 the extrinsic level is shown closer to the conduction band than to the valence band, it can be anywhere in the gap. However, one of the two energy differences must be less than the quantum energy of the radiation to be detected.

FIG. 3 shows one method by which an extrinsic semiconductor of the general type illustrated in FIG. 2 may be used to increase the sensitivity of infrared image transducers through a controlled recombination of the conduction band electrons. In this system, the infrared image, for which the quantum energy is at least $E_{XC}$ has seen in FIG. 2, is formed on target plate 3 by a suitable optical system 4. The target plate is made of a semiconductor having an energy diagram corresponding to FIG. 2, and the extrinsic level may be either a donor or an empty level.

Considering first the operation of FIG. 3 when the extrinsic level is a donor level, during the interval $t_0$–$t_1$, as seen in FIG. 4, the infrared radiation ($E_{XC}$) falling on plate 3 raises electrons from the extrinsic level to the conduction band, the number $n_s$ raised increasing linearly with time as shown by waveform *a* of FIG. 4. As already explained, this process leaves holes at the extrinsic level, and and the raised electrons do not recombine but remain at the conduction level. During the interval $t_1$–$t_2$, light source 5 is energized flooding target plate 3 with radiation of energy $E_{VX}$. A filter 6 is used to remove radiations of other wavelengths if present. The radiation of energy $E_{VX}$ raises electrons from the valence band to the extrinsic level filling the holes left at that level and leaving holes in the valence band. The electrons in the conduction band then recombine with the holes in the valence band, giving up radiation of quantum energy $E_{CV}$ or $E_{CR}$, as previously explained. The resulting image, which is in the visible spectrum, is focused onto the photocathode of a photoemissive image transducer 7, such as an image orthicon, by a suitable optical system 8 which may be a lens system or an optical fiber device.

The vertical or frame scan of image transducer 7 is synchronized with the energization of flooding light source 5 by pulse and sweep generator circuit 9, the relationship being as illustrated by waveforms *b* and *c* of FIG. 4. During the retrace period of the image transducer 7, its photocathode receives the visual image produced by the flooding of plate 3 during this period. This results in a corresponding charge pattern on the target plate of transducer 7, as already explained for the image orthicon, which is scanned and converted into a video signal during the ensuing vertical scan period. The scanning beam should be blanked during the retrace interval $t_1$–$t_2$ so as not to interfere with the charge pattern being stored. This scanning erases the charge pattern so that the target plate is ready to receive the new charge pattern resulting from the visual image produced during the next retrace period. The photocathode of device 7 should either be insensitive to the light from source 5–6 or this light should be prevented from reaching it by a filter 10. If it is desired to produce a visual image from the video output of transducer 7, the video signal in output circuit 11 may be amplified, if required, and applied to a cathode ray tube reproducer 12, the scanning of which is synchronized with that of transducer 7.

The second mode of operation of FIG. 3, in which the extrinsic level is an empty rather than a donor level, is not essentially different from the mode of operation described above. During the retrace intervals $t_1$–$t_2$, $t_3$–$t_4$, etc. the crystal is flooded with light of quantum energy $E_{VX}$ from source 5. This raises electrons from the valence band to the extrinsic level leaving holes in the valence band with which conduction band electrons then recombine producing radiation of quantum energy $E_{CV}$ or $E_{CR}$ The radiation produced during each retrace interval is applied to the image transducer 7 as before, resulting in the production of a video signal during the ensuing vertical scanning period. In the semiconductor plate 3 during each scanning period, the incident infrared radiation raises electrons to the conduction band from the supply of electrons raised to the extrinsic level during the previous retrace interval, in accordance with waveform *a* of FIG. 4.

As stated earlier, the extrinsic level (FIG. 2) may be located at any position in the energy gap of the semiconductor. When located nearer the valence level than the conduction level, less quantum energy is required to raise an electron from the valence level to the extrinsic level than from the extrinsic level to the conduction band and it may be advantageous to use the radiation to be detected for this purpose. In this case, $E_{VX}$ (FIG. 2) may represent the infrared radiation and $E_{XC}$ the flooding light. During the scanning intervals $t_0$–$t_1$, $t_2$–$t_3$, etc. the infrared radiation raises electrons from the valence band to the extrinsic level, which in this case is an empty level,, leaving holes in the valence band. During the ensuing retrace intervals $t_1$–$t_2$, $t_3$–$t_4$, etc. the semiconductor is flooded with light of energy $E_{XC}$, raising these electrons to the conduction band from which they then recombine with the holes in the valence band giving off light of energy $E_{CV}$ or $E_{CR}$, as before. In other respects the operation is the same as in the FIG. 3 modes described above.

In all of the above described modes of FIG. 3, the operation approaches that represented by Equation 1 to the extent that the scanning interval $t_0$–$t_1$ approaches the total frame interval $t_0$–$t_2$. The embodiment in FIG. 5 effectively collects quanta over the entire frame interval and therefore performs in accordance with Equation 1.

Referring to FIG. 5, the target plate 3, on which the image of the radiation $E_{XC}$ to be detected is focused by a suitable optical system 4, is an extrinsic semiconductor of the type illustrated in FIG. 2 in which the extrinsic level is a donor level. The plate 3 is scanned by a small spot of light having a quantum energy $E_{VX}$. This spot is formed on the phosphor screen of cathode ray tube 13 by the electron beam which is caused to scan the screen of the tube by horizontal and vertical sweep voltages applied to deflection yoke 14 from sweep generator 15. This generator also produces blanking pulses which are applied to the beam intensity control electrode of tube 13 to blank this tube during the retrace intervals. An image of the screen of tube 13 is formed on the target plate 3 by a suitable optical system 16 with the result that the spot of light on the screen of tube 13 scans the target plate. The size of the spot is made equal to the size of a resolution element on plate 3, and it is apparent that the interval between successive scans of any resolution element equals the frame interval, i.e. the interval $t_0$–$t_2$ or $t_2$–$t_4$ in FIG. 4. During this interval, the infrared radiation of energy $E_{XC}$ received by each elemental area of the target plate raises electrons from the extrinsic donor level to the conduction band in that area, leaving holes at the extrinsic level. Each time the scanning spot, of energy $E_{VX}$, passes over that elemental area of the target plate, electrons are raised from the valence level to fill the holes at the extrinsic level. At the same time, the electrons in the conduction band recombine with the holes in the valence band producing light of energy $E_{CV}$ or $E_{CR}$. The light produced by each elemental area of the target plate during the scanning process is collected by the photocathode or photomultiplier 17, through a suitable optical system 18, and converted into an electrical current which is amplified by electron multiplication to produce a video signal in output circuit 19. This may be converted to a visual image by further amplification in video amplifier 20' and application to the beam intensity control electrode of a cathode ray tube reproducer 20, the sweep of which is synchronized with that of tube 13.

The optical coupling between plate 3 and the photocathode of photomultiplier 17 is shown in FIG. 5 as a lens; however, any other suitable coupling device, such as optical fibers, may be employed. It would also be possible to locate plate 3 within tube 17 close to the photocathode so that no separate optical coupler is required. In effect the optical system 18 should form an image of the target plate on the photocathode. In any event a filter 21, passing light of wavelength corresponding to $E_{CV}$ or $E_{CR}$ but rejecting the scanning light $E_{VX}$, should be situated between the semiconductor 3 and the photocathode of tube 17.

As stated, cadmium sulfide (CdS) is a suitable semiconductive material for the target electrodes of the above described image transducers. Methods for growing single crystals of CdS large enough for this purpose are known in the art and described in the literature, for example, in an article entitled "Method for Growing Large CdS and ZnS Single Crystals," by Greene, Reynolds et al., appearing in The Journal of Chemical Physics, vol. 29, No. 6, pp. 1375–1380, December 1958. While there is no process known with 100 percent reproducible results for growing extrinsic crystals of CdS with a donor level in the energy gap, the process described in the above article will provide a fair number of such crystals which may be identified by tests. Extrinsic CdS crystals with an empty level in the energy gap may be produced with predictable results in the following process:

This process, which is a diffusion doping process with lead sulfide PbS, begins with a relatively pure single crystal CdS plate derived from a crystal grown by a suitable method such as that described in the above referenced article. The plate is first etched with fumes from boiling hydrochloric acid at a distance of approximately 10 cm. for about 30 seconds. The etched plate is then placed on a gas tight chamber and the pressure reduced to about $10^{-6}$ torr. PbS is then evaporated within the evacuated chamber and allowed to deposit on one side of the plate to a thickness that reduces the visible transmission by about 20 percent. Finally the plate is baked in normal atmospheric conditions at 400° C. for about 2 hours. The steps of the process are illustrated in the diagram of FIG. 6.

Semiconductor target plates made by the above process have an empty extrinsic level at an energy separation from the conduction band of about 0.41 ev., corresponding to a wavelength of about 3 $\mu$m. The total energy gap of the crystal, i.e. the gap between the valence band and the conduction band, is 2.54 ev.

I claim:

1. A low quantum energy image transducer comprising: a target plate for receiving said image made of a semiconductor having an extrinsic energy level in the energy gap between the valence and conduction bands that is separated from the conduction band by an energy gap not greater than the quantum energy of the radiation forming the image; normally deenergized means for flooding the entire target plate with light having a quantum energy corresponding to the energy gap between the valence band and said extrinsic level; a relatively high quantum energy image transducer having an image receiving element sensitive to radiations with quantum energies approaching and equal to the total gap energy of said semiconductor, and having means including vertical and horizontal scanning means for converting a received image into a video signal representing successive frames of image information; means for forming an optical image of said target plate on the image receiving element of said high quantum energy image transducer; and means synchronized with the vertical scanning means of said high quantum energy image transducer for energizing said flooding means during the intervals between successive vertical scans.

2. Apparatus as claimed in claim 1 in which said extrinsic level is a donor level.

3. Apparatus as claimed in claim 1 in which said extrinsic level is an empty level.

4. Apparatus as claimed in claim 1 and in addition a cathode ray tube reproducer having vertical and horizontal scanning means synchronized with the vertical and horizontal scanning means of said high quantum energy image transducer and a video signal input; and means for applying the video signal produced by said high quantum energy image transducer to the video signal input of said reproducer.

5. Apparatus as claimed in claim 1 in which an optical filter opaque to said flooding light is interposed between said target plate and the image receiving element of said high quantum energy image transducer.

References Cited

UNITED STATES PATENTS

| | | | |
|---|---|---|---|
| 2,482,815 | 9/1949 | Urback | 250—71 |
| 2,727,183 | 12/1955 | Marshall | 315—11 |
| 2,756,343 | 7/1956 | Johnson | 250—71 |
| 3,031,574 | 4/1962 | Halsted | 250—71 |
| 3,070,698 | 12/1962 | Bloembergen. | |
| 3,123,737 | 3/1964 | Schneeberger | 315—10 |
| 3,188,467 | 6/1965 | Weissenberg | 250—71 |

ROBERT L. GRIFFIN, Primary Examiner

JOSEPH A. ORSINO, Jr., Assistant Examiner

U.S. Cl. X.R.

250—71, 83.3, 213; 313—65; 315—10